P. J. A. SCHNOOR.
SWIVEL.
APPLICATION FILED APR. 6, 1911.
1,002,875.
Patented Sept. 12, 1911.
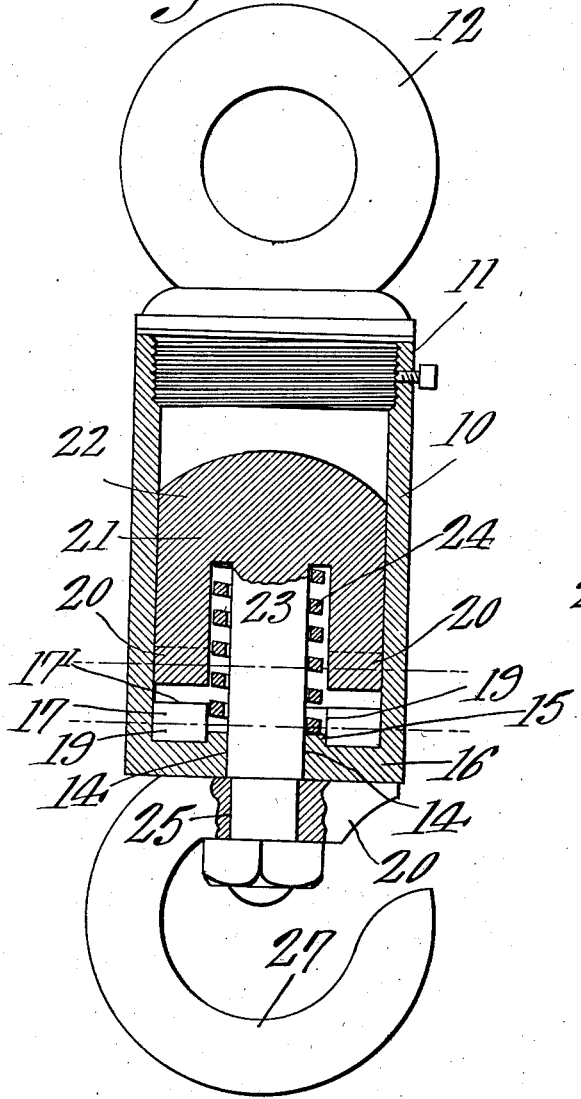
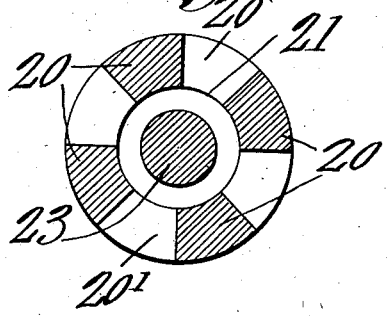
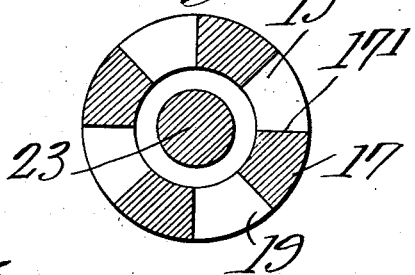
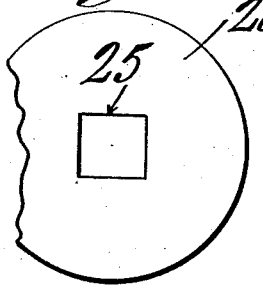
Witnesses
Peter J. A. Schnoor,
Inventor
by
Attorneys

UNITED STATES PATENT OFFICE.

PETER JACOB ADOLPH SCHNOOR, OF HOLSTEIN, IOWA.

SWIVEL.

1,002,875.  Specification of Letters Patent.  Patented Sept. 12, 1911.

Application filed April 6, 1911. Serial No. 619,320.

*To all whom it may concern:*

Be it known that I, PETER J. A. SCHNOOR, a citizen of the United States, residing at Holstein, in the county of Ida and State of Iowa, have invented a new and useful Swivel, of which the following is a specification.

This invention relates to an improvement in swivels.

The primary object of said invention is to provide a swivel which will lock when weight is applied to one of its connecting ends, the device being of such construction that until weight or pressure is applied to one of the ends, the same is free to revolve.

In the drawings—Figure 1 is a view of the device partly in section. Fig. 2 is an end view of a movable clutch member. Fig. 3 a similar view of a stationary clutch member, and Fig. 4 an end view of the hook 27 showing the manner in which the same is secured on the pin 14.

In the drawings 10 designates a cylindrical casing provided with an open end 11 which is interiorly screw threaded to receive an eye 12. The other end of the member 10 is closed and is provided with the centrally arranged opening 14, a boss 15 being arranged on the inner face of the end portion 16, said boss practically forming a continuation of the wall of the bore 14. An annular member 17 surrounds this boss, its outer edge contacting with the walls of the cylinder. This member 17 is provided with the clutch face 17' disposed toward the open end of the cylinder, the openings 19 in the member 17 registering with projections 20 formed on a member 21 which is similar to the member 17, its clutch face being oppositely disposed to the clutch face of said member, the projections on the member 17 entering the cut away portion 20' of the member 20 when the members are brought together. Arranged within the cylinder is a plunger 22 to one face of which the member 20 is secured. This plunger is formed with the cylindrical extension or pin 23, the plunger being reduced adjacent said pin thereby forming a barrel or bore which surrounds a portion of the pin. A spring 24 is coiled around said projection or pin, one end of said spring bearing against the plunger, its other end contacting with the boss 15, normally spacing said plunger from the end of the cylinder and consequently holding the annular members 17 and 20 out of contact. The projection 20 is formed with a square end which extends within a correspondingly shaped aperture 25 formed in the plate 26 of an eye or hanger 27.

It will be noted that with the various parts in the position shown in Fig. 1 the plunger 22 will be free to revolve within the cylinder and the eye 27 which is secured to an integral part of said plunger may likewise be freely rotated. However, it will be noted that should the springs which normally separate the clutch members be compressed by pulling upon either or both of the eyes, the clutch members 17 and 20 will interlock thus preventing the further rotation of the plunger.

The many advantages of a swivel constructed in this manner will be clearly apparent as it will be noted that the same will act as a swivel until the eyes are drawn apart. It will be seen that when the members 17 and 20 are clutched together the device forms the supporting or connecting member, the attaching ends of which are not movable independently. While the open end of the cylinder 10 is shown provided with the eye 12 it will be seen that the same may receive a screw threaded extension of any type of hanger, the same being particularly adapted for supporting pulleys, the pulley in this instance being supported by a suitable casing which is formed with a screw threaded extension which may be fitted within the open end of the member 10. Attention is called to the fact that when a pulley is substituted for the eye 12 and the eye 27 supported by a suitable hanger the pulley which may be used for hoisting purposes is free to rotate until the load is applied. As soon as the load is applied however it will be noted that the clutch members 17 and 20 will be locked together and during the raising or lowering of the load the pulley will be effectually held against turning.

Attention is called to the fact that a device of this character is simple in construction and economical to manufacture, the arrangement of the various parts being such that the same may be readily assembled.

What is claimed is:

1. A swivel consisting of a cylindrical casing, a hanger secured to said casing, a plunger arranged within said cylinder, a member formed integral with said plunger, said member extending through an aperture formed in the end of the casing, a hanger supported by said member, said second mentioned hanger being movable independent of the casing, and means for locking said hanger against rotary movement.

2. A swivel consisting of a cylindrical casing, a plunger arranged in said casing, a hanger supported by said plunger, said plunger being normally spaced from one end of said casing, a hanger secured to said casing, said first mentioned hanger being capable of a rotary movement independent of said casing for locking said hanger against movement.

3. A swivel consisting of a cylindrical casing, a hanger supported by said casing, a plunger arranged within said casing, said plunger being formed with a reduced extension, said extension projecting through one end of said casing, a hanger supported by said reduced extension, said hanger restricting the movement of said plunger in one direction, a coiled spring restricting the movement of said plunger in the other direction.

4. A swivel consisting of a cylindrical casing, said casing being formed with an open end, a plunger arranged within said casing, a reduced extension formed integral with said plunger, said plunger being reduced adjacent said extension to form a bore surrounding a portion of said extension, a coiled spring housed within said bore, one end of said spring contacting with said plunger, said plunger being formed with a clutch face, an annular member supported by the end of the cylinder, said member being formed with a clutch face, said spring normally spacing said clutch faces.

In testimony that I claim the foregoing as my own, I have hereto affixed my signature in the presence of two witnesses.

PETER JACOB ADOLPH SCHNOOR.

Witnesses:
ALBERT G. MERKLEY,
C. H. LOOP.